United States Patent
Alexandrov (10) Patent No.: US 7,095,183 B2
(45) Date of Patent: Aug. 22, 2006

(54) CONTROL SYSTEM FOR A RESONANT INVERTER WITH A SELF-OSCILLATING DRIVER

(75) Inventor: Felix I. Alexandrov, Burlington, MA (US)

(73) Assignee: Osram Sylvania Inc., Danvers, MA (US)

( * ) Notice: Subject to any disclaimer, the term of this patent is extended or adjusted under 35 U.S.C. 154(b) by 58 days.

(21) Appl. No.: 10/886,399

(22) Filed: Jul. 7, 2004

(65) Prior Publication Data
US 2006/0006815 A1    Jan. 12, 2006

(51) Int. Cl.
*H05B 37/02* (2006.01)
(52) U.S. Cl. .................. 315/224; 315/307; 315/DIG. 7
(58) Field of Classification Search ............. None
See application file for complete search history.

(56) References Cited

U.S. PATENT DOCUMENTS

| | | | | |
|---|---|---|---|---|
| 4,998,064 A | | 3/1991 | Fuderer et al. ............ | 324/309 |
| 5,119,012 A | * | 6/1992 | Okamura ................... | 323/258 |
| 5,245,253 A | | 9/1993 | Quazi ....................... | 315/224 |
| 5,528,002 A | * | 6/1996 | Katabami .................. | 178/19.06 |
| 5,719,472 A | | 2/1998 | Kachmarik et al. ....... | 315/224 |
| 5,723,953 A | | 3/1998 | Nerone et al. ............ | 315/307 |
| 6,008,593 A | | 12/1999 | Ribarich ................... | 315/307 |
| 6,246,183 B1 | | 6/2001 | Buonavita ................. | 315/248 |
| 2003/0147263 A1 | | 8/2003 | Ribarich | |

OTHER PUBLICATIONS

IR Application Notes AN-9995A Electroninc Ballast Using the Cost-Saving IR2155X Drivers, pp. C-59-C68, (approx. 1999).
Melvinb C. Cosby and R.M. Nelms, IEEE Transactions On Industrial Electronincs, vol. 41, No. 4, Aug. 1994.
IR Design Tip DT98-1, "Variable Frequency Drive using IR215X Self Oscillating IC's", pp. 1-7, 1999.

* cited by examiner

*Primary Examiner*—David Vu (57) ABSTRACT

A controller for a resonant inverter with a self-oscillating driver IC for powering AC loads, such as gas discharge lamps or regulated DC/DC converters, includes a timing circuit that generates control strobe pulses that are injected into the timing circuit. The timing circuit is coupled to an inverter resonant tank through a feed back circuit providing phase lock for the resonant inverter. The feed back circuit includes a passive phase shifting circuit for 360° closed loop phase shift. Phase controlled strobe pulses automatically adjust IC oscillator frequency for safe and stable inverter operation above resonant frequency. By injecting a small AC or DC control signal into the timing circuit, sync strobe pulse phase angle can be advanced or delayed and thus frequency and power of the phase lock system can be controlled.

9 Claims, 10 Drawing Sheets

CONTROL SYSTEM FOR A RESONANT INVERTER WITH A SELF-OSCILLATING DRIVER

BACKGROUND OF THE INVENTION

The present invention relates to resonant inverters for powering AC loads, preferably gas discharge lamps, and for dimming such lamps. The invention also relates to regulated DC/DC converter circuits.

The following references are incorporated by reference: U.S. Pat. Nos. 5,245,253; 4,998,046; 6,246,183; 5,723,953; and 5,719,472; U.S. Patent Application US 2003/0147263 A1; IR Application Notes AN-995A "Electronic Ballast Using the Cost-Saving IR2155X Drivers"; IR Design Tip DT98-1, "Variable frequency Drive Using IR215X self oscillating IC's"; and "A Resonant Inverter for Electronic Ballast Application," Melvin C. Cosby and R. M. Nelms, *IEEE Transactions On Industrial Electronics*, vol. 41, no. 4, August 1994.

A gas discharge lamp typically utilizes electronic ballast for converting AC line voltage to high frequency current for powering the lamp. Conventional electronic ballasts include an AC to DC converter and a resonant inverter converting DC voltage to lamp high frequency current. The resonant inverter includes switching transistors generating a high frequency rectangular AC voltage that is applied to a voltage resonant circuit having an inductor and a capacitor in series. The gas discharge lamp is coupled in parallel to the capacitor. For high frequency electronic ballasts, a self-oscillating resonant inverter is a common part that generates AC voltage for starting and AC current for powering the lamp. Self-oscillating resonant inverters utilize a feed back transformer coupled between a resonant tank circuit and gates of the switching transistors to provide a sinusoidal voltage to the gates for sustaining the oscillations. Resonant inverters are also used in DC/DC converters.

The main advantage of resonant inverters is zero voltage switching that permits operation at higher switching frequencies. A typical resonant inverter comprises a half (or full) bridge with power MOSFETs generating high frequency AC to power a resonant load. Three types of resonant loads are common that differ by real load coupling to LC components: series, parallel and series-parallel circuit configurations. In any combination of resonant load components, the control circuit provides MOSFET switching above resonant frequency for efficient and reliable MOSFET operation. When switching above resonant, the input of the resonant load is inductive. When switching below resonant, this input is capacitive and should be avoided. Self-oscillating inverter circuits built as oscillators with a positive feed back automatically provide a stable inductive mode of operation. In such oscillators, switching frequency advances the resonant frequency of the resonant load and tracks any changes in resonant load.

Ballasts with high frequency oscillating inverter standard industrial controllers and self-oscillating half bridges, such as the IR215X and IR53H(D) series from International Rectifier or the L6579 series from ST Microelectronics and others, do not have the drawbacks of self-oscillating resonant inverter circuits. However, the pre-adjusted switching frequency is not sensitive to resonant frequency changes of the resonant load, and is susceptible to noise and variations of integrated circuit (IC) supply voltage Vcc. In view of this, a direct application of these controllers is not likely. Without correction of switching frequency, the MOSFETs could cross conduct and fail when operating below resonant frequency in some steady-state conditions, dimming mode or, at lamp starting. Also, power control with the above ICs is not provided.

One solution for avoiding this problem is described in Application Notes AN 995A "Electronic Ballasts Using the Cost-Saving IR215X Drivers" issued by International Rectifier. This reference recommends a feed back circuit with two anti-parallel power diodes connected in series with the resonant load as zero current detectors. The diodes generate a rectangular AC pulse signal that forces the timing circuit in the IC to switch synchronously with this signal. A feed back signal indicates phasing of current in the resonant load. However, zero current sensing in any portion of the resonant load does not provide the necessary 360° positive feed back angle for phase locked operation above resonant frequency. In addition, when used as a source of synchronization signals, the power diodes add significant power losses to the ballast.

Other prior art IC driven resonant inverters are disclosed in U.S. Pat. Nos. 5,723,953 and 5,719,472. Both patents teach half bridge IC feed back control by changing sinusoidal control signal amplitude. With this approach, phase shifting is forced to depend on the amplitude of the feed back signal and thus the stability of the oscillating system can be pure, especially during transients.

U.S. Patent Application 2003/0147263 A1 discloses a phase delay control that controls the inverter. This control has a static feed back circuit having an input signal representing the phase of the inductor current which is compared with a signal representing a reference phase. The difference, or error signal, is supplied to a voltage controlled oscillator (VCO) to control inverter frequency and power. This control technique utilizes active components incorporated in a controller for processing pulse signals.

The present applicant's prior application (Ser. No. 10/649,898) discloses a method for controlling a resonant inverter by synchronization of a self-oscillating driver IC. The method utilizes a voltage attenuated and phase shifted feed back sinusoidal signal for loop lock up. Even so, there is still a need for circuitry with a wider range of control and better robustness and phase shift control.

One of the problems of the prior art circuits for internal synchronization of IC driven resonant half bridge inverters is that they require significant phase rotation to get 360° total phase shift of the feed back signal. It is very desirable, for reliable phase lock up and before closing the loop, that the injected feed back signal is generated with a minimum phase difference relative to the external synchronization signal. It is also very desirable for reliable synchronization that the injected signal be sufficiently above the ramp signal in wide range of operating frequencies. It is also very disable to have inverter output power control by a small external DC signal (as when dimming).

SUMMARY OF THE INVENTION

It is an object of the present invention to provide a method and circuit for wide range reliable synchronization of self-oscillating ICs from a small sinusoidal signal.

It is another object of the present invention to provide feed back phase lock up circuit for the resonant inverter via the synchronization circuit.

It is still another object of the invention to provide a voltage phase lock loop circuit with minimum required phase shifting built with inexpensive passive components.

It is yet another object of the invention to provide a voltage feed back circuit with variable phase shift for generating a sinusoidal phase signal and increasing inverter frequency during lamp starting.

It is a further object of the invention to provide a combined voltage/lamp current phase control feed back circuit for optimization of starting and steady state operation modes.

It is still a further other object of the invention to provide a feed back circuit with variable structure for generating phase signals and increasing inverter frequency during lamp starting.

It is yet a further object of the invention to provide programmed inverter frequencies during inverter open circuit and during steady-state lamp operation.

It is an additional object of the invention to provide inverter power control (dimming) with a small DC signal.

It is still an additional object of the invention to provide power converter regulated output voltage or current.

Unlike prior resonant inverters with phase control, the present invention includes a control system that utilizes sinusoidal signals in its phase control so passive components can be used for phase shifting. By contrast, prior art systems manipulate with pulse signals utilizing active components for phase shifting. The present invention provides an efficient and cost effective system for controlling a resonant inverter through a cost effective IC. With only a few external components, effective synchronization and dimming are obtained. With the addition of voltage and current feed backs coupled to these inputs, ballast inverter circuits for powering gas discharge lamp can be obtained.

BRIEF DESCRIPTION OF THE DRAWINGS

The above and other features and advantages of the invention will be better understood through the following illustrative.

DESCRIPTION OF PREFERRED EMBODIMENTS

Figure 1A:
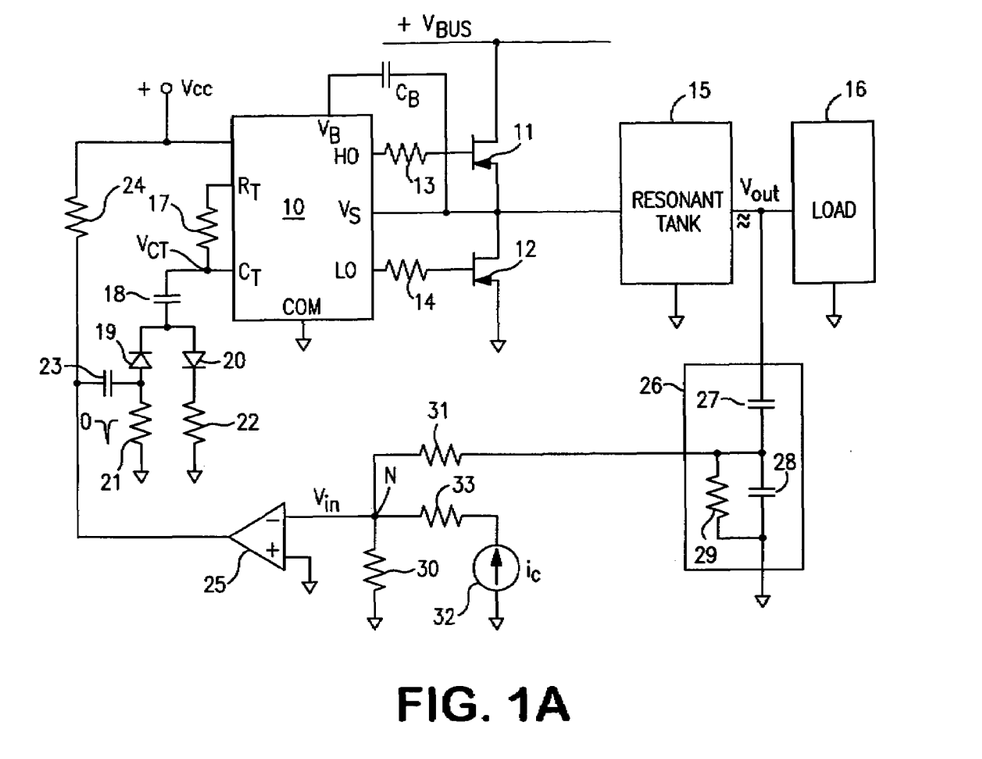
FIG. 1A is a circuit diagram of a resonant inverter driven by a self-oscillating IC with voltage loop lock up and external control in a first embodiment of the present invention.

FIG. 1A is a ballast resonant inverter block-circuit diagram with a standard self-oscillating driver integrated circuit (IC) 10 that illustrates a synchronizing control arrangement of the present invention. HO and LO outputs of IC 10 drive a half bridge power stage that includes MOSFETs 11 and 12 and gate resistors 13 and 14. IC 10 is provided with a bootstrap capacitor $C_B$ connected to the pin $V_B$ of IC 10 coupled to a bootstrap diode (not shown). MOSFETs 11 and 12 are connected to high voltage (+V bus) DC for generating AC voltage across the input of a resonant tank 15. A load 16, such as a gas discharge lamp or a transformer with a rectifier with a filter, is coupled to resonant tank 15. The controller IC 10 has a built-in oscillator that is similar to the industry standard CMOS 555 timer. Initial oscillator frequency can be programmed with a timing circuit that includes external timing resistor 17 and timing capacitor 18 coupled to pins $C_T$ and $R_T$ of IC 10. In the circuit of FIG. 1A and other similar circuits disclosed below, low side output LO of IC 10 is in phase with the $R_T$ pin voltage signal. Since the $R_T$ pin voltage potential changes between low (0) and high (+Vcc) relative to the common terminal (COM), $C_T$ pin voltage $V_{CT}$ has a ramp shape superposed on DC voltage. IC 10 oscillator switches at high (⅔ Vcc) and low (⅓ Vcc) predetermined CT pin voltage levels.

In one aspect of the present invention, the timing circuit is improved by inserting between the COM terminal and the timing capacitor 18 a network with two anti-parallel diodes 19 and 20 and series resistors 21 and 22 that are both coupled to the COM terminal. A small capacitor 23 (e.g., 100–200 pf) is connected to a node between diode 19 and resistor 21 and to +Vcc terminal through a resistor 24. The node between capacitor 23 and resistor 24 is connected to the output of a zero signal detector (ZSD) 25 that switches when an input signal Vin at a first input terminal changes polarity. ZSD 25 may be a high frequency amplifier, a voltage comparator, or a single transistor. The circuit of FIG. 1A uses an inverting type ZSD. The ZSD 25 will initiate an instant discharge of capacitor 23 to the resistor 21 when ZSD 25 sinusoidal input signal changes from negative to positive. Negative strobe pulses generated across resistor 21 will be superposed on the CT pin ramp voltage $V_{CT}$. This strobe pulse control can be used in control ICs utilizing different types of oscillators with timing capacitor $C_T$ tied to ground (common).

Figure 1B:
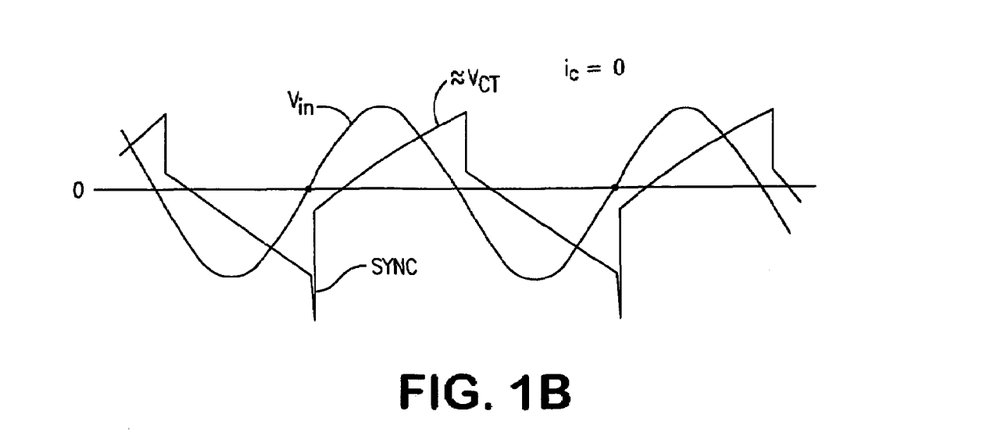
FIG. 1B shows waveforms of signals forming synchronizing strobe pulses in the timing circuit of FIG. 1A.

FIG. 1B demonstrates waveforms in the circuit of FIG. 1A, including negative strobe pulses generated by ZSD 25 when its sinusoidal input signal Vin changes from negative to positive. Negative strobe pulses that are superposed on the ramp voltage $V_{CT}$ force IC 10 switching before ramp voltage $V_{CT}$ achieves the lower ⅓ Vcc limit.

The control system can be built with any type of full wave resonant inverter (series, parallel or series-parallel) and any type of load (gas discharge lamps, induction heaters, transformers with rectifiers with filters and DC loads, etc.)

According to a further aspect of the present invention, a voltage lock up loop circuit is provided from an output of resonant tank 15 to the input of ZSD 25 via a phase compensator 26. Phase compensator 26 provides a phase advance (or delay) for a feed back signal that synchronizes the controller at a desirable frequency by providing a phase shift of up to 360° in the feed back loop. The output voltage Vout from the resonant tank 15 is attenuated and phase shifted by the phase compensator 26. In FIG. 1A, an economical version of phase compensator 26 is shown having series capacitors 27 and 28 and a resistor 29 connected in parallel to the capacitor 28. Other embodiments of phase compensator 26 also built with passive components are disclosed below.

The system described above can be provided with a controller for additional inverter frequency/power control. The system oscillating frequency is controlled by changing strobe pulse phase. As shown in FIG. 1A, the controller may include a source 32 of a variable DC bias current ic that is coupled to ZSD 25 input Vin via resistor 33 for external strobe pulse phase control. A resistive divider with resistors 30 and 31 may be used as a matching network for ZSD 25 input. A node N may be connected to (a) the phase compensator 26 through resistor 31, (b) the source 32 of DC bias current $I_C$ through resistor 33, (c) resistor 30 that is connected to ground, and (d) the first input terminal of the ZSD 25.

Figure 2A:
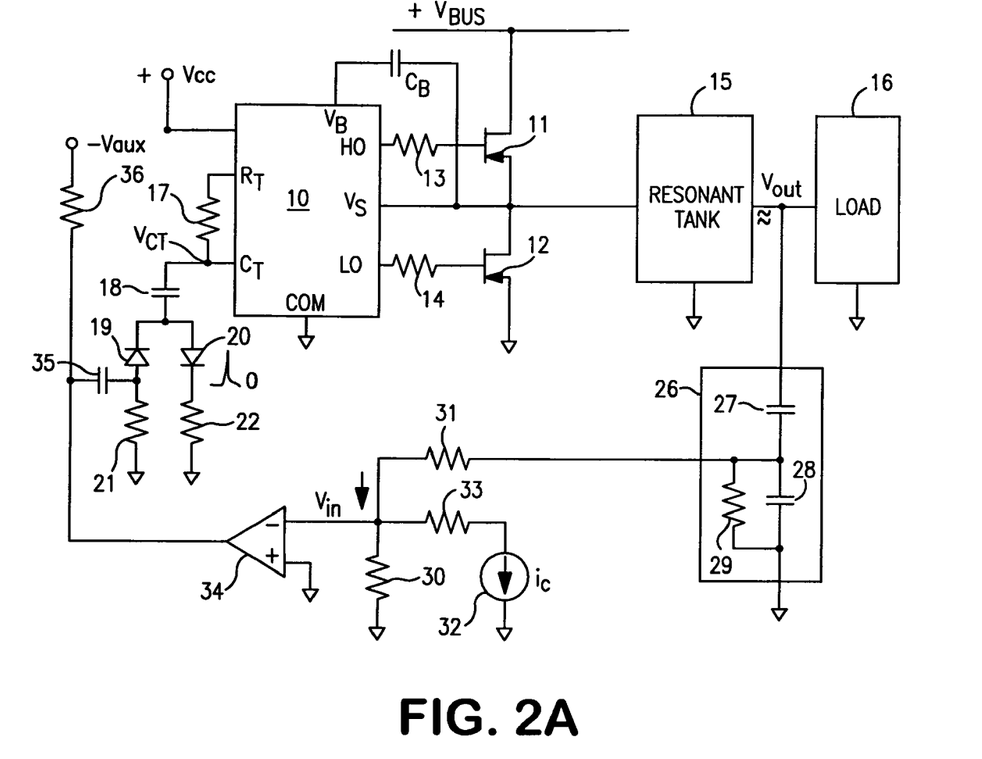
FIG. 2A is a circuit diagram of a further embodiment in which the resonant inverter is driven by a self-oscillating IC similar to FIG. 1A, but having inverted control signals.

FIG. 2A illustrates another embodiment that includes a non-inverting ZSD 34 whose output is coupled to the resistor 22 via further capacitor 35. A positive strobe pulse is generated across the series resistor 22 by discharging the further capacitor 35 to the resistor 22 via ZSD 34. This embodiment is similar to the first embodiment except that further capacitor 35 is connection to the node between diode 20 and resistor 22 and the other input terminal of ZSD 34 receives Vin. With this connection, charge intervals of the timing capacitor 18 can be controlled. The further capacitor 35 is charged from a negative auxiliary voltage source Vaux through a limiting resistor 36. When input signal Vin of ZSD 34 changes from positive to negative, a positive strobe pulse is generated across the resistor 22 by discharging the capacitor 35 to the resistor 22 via ZSD 34.

Figure 2B:
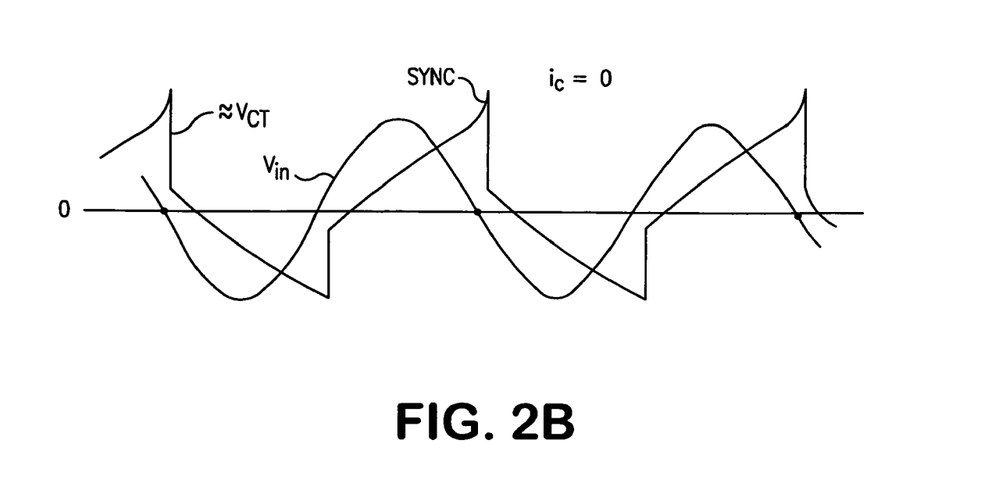
FIG. 2B shows waveforms of signals forming synchronizing strobe pulses in the timing circuit of FIG. 2A.

As can be seen from FIG. 2B, positive strobe pulses are superposed on the $V_{CT}$ ramp voltage. As a result, strobe pulses force oscillator to switch before the point when ramp voltage $V_{CT}$ achieves the higher ⅔ Vcc limit.

Both negative and positive strobe pulses of these two embodiments provide a wide range of reliable frequency control as the amplitude of the strobe pulse is comparable to peak-to-peak ramp voltage and may be higher than this voltage.

The circuits of FIGS. 1A and 2A have identical open loop control characteristics and may use identical feed back signal shifting for phase lock up. That is, the DC control signal $I_C$ may be applied to the sinusoidal voltage feed back input to ZSD 25 or 34 to shift a switching angle of ZSD 25 or 34. With a closed lock up loop, phase shifting in the feed back loop by means of the source of bias current 32 provides frequency control of the resonant inverter.

The further embodiments described below are variations of the first and second embodiments that provide yet further improvements and facilitate an understanding of the present invention.

Figure 3A:
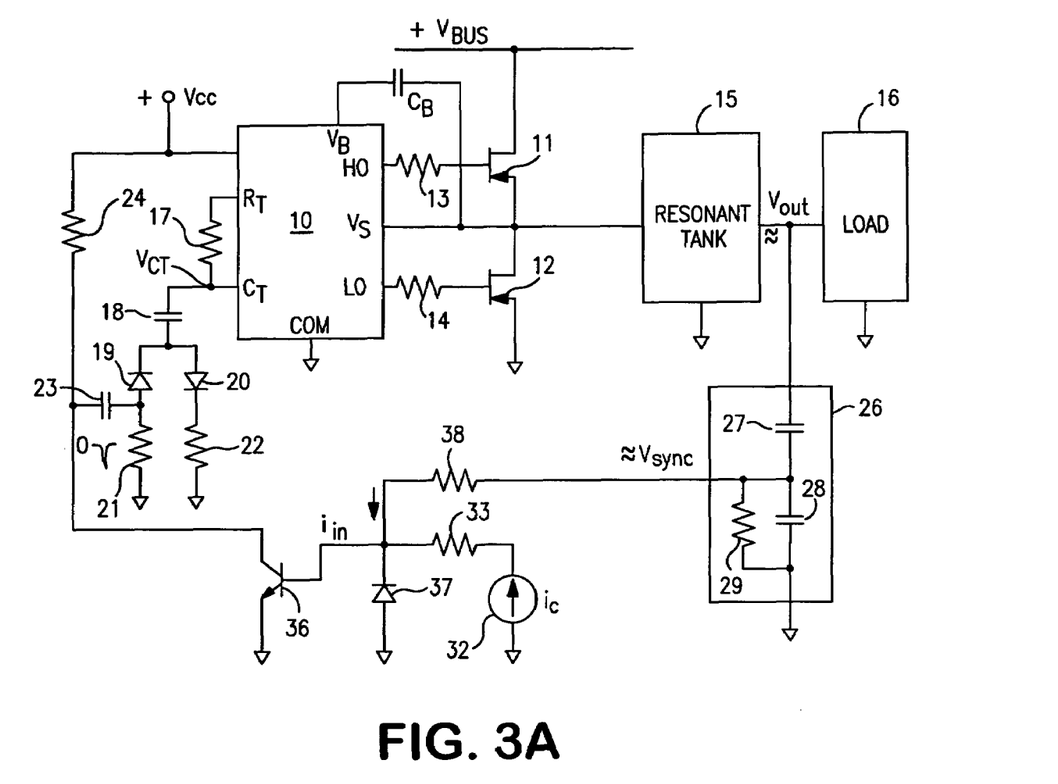
FIG. 3A is a circuit diagram of yet a further embodiment in which the resonant inverter uses control based on an n-p-n transistor in the feed back loop.
Figure 3B:
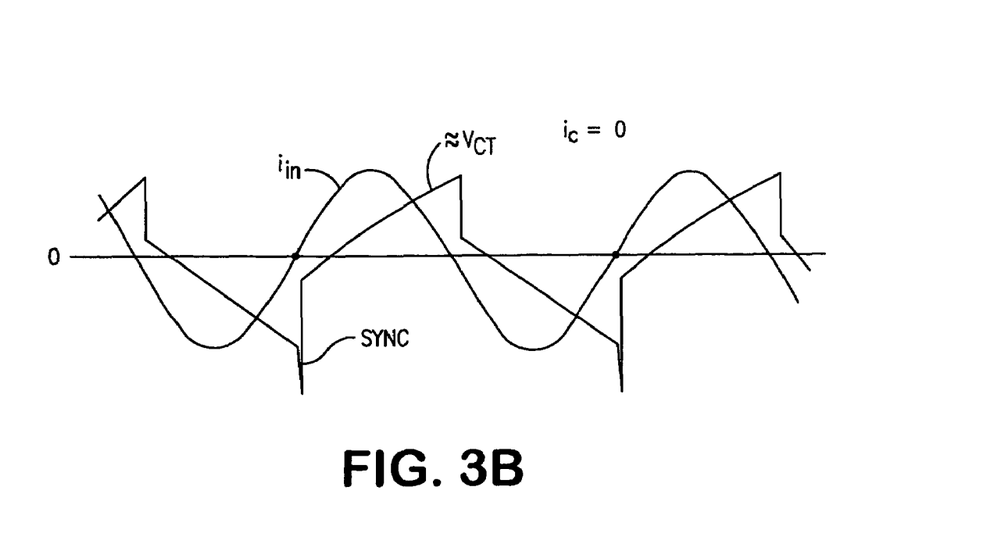
FIG. 3B shows waveforms of signals forming synchronizing strobe pulses in the control circuit of FIG. 3A.

FIGS. 3A–B illustrate an embodiment with an n-p-n transistor 36 as a zero signal detector. To provide symmetrical switching from an AC current source, an anti-parallel diode 37 is connected to the base-emitter junction of the transistor 36. The input of transistor 36 is coupled to the output of the phase compensator 26 via resistor 38, so transistor 36 could be considered a voltage driven device. When transistor 36 is OFF, the capacitor 23 is charged via resistors 24 and 21 by the small current derived from +Vcc voltage. When the transistor 36 turns ON, the capacitor 23 instantly discharges to resistor 21, generating negative strobe pulses. The strobe pulses synchronize the oscillator of IC 10 with sinusoidal voltage Vsync. The phase angle between output inverter voltage Vout and external synchronizing sinusoidal voltage Vsync (assuming open loop at resistor 38) corresponds to the phase shifting angle from phase compensator 26 for phase lock up at inverter operating frequency. For most AC loads, including gas discharge lamps, a phase advance phase compensator 26 is used (a phase advance schematic is shown in all drawings). If a small phase delay is needed, a phase delay compensator may be used. For instance, for a phase delay or a zero phase shift, an additional resistor (not shown) can be connected in parallel to the capacitor 27 in the phase compensator 26. Control current $I_C$ from source 32 provides DC bias to the base of transistor 36 via resistor 33 for inverter frequency/power control.

Figure 4A:
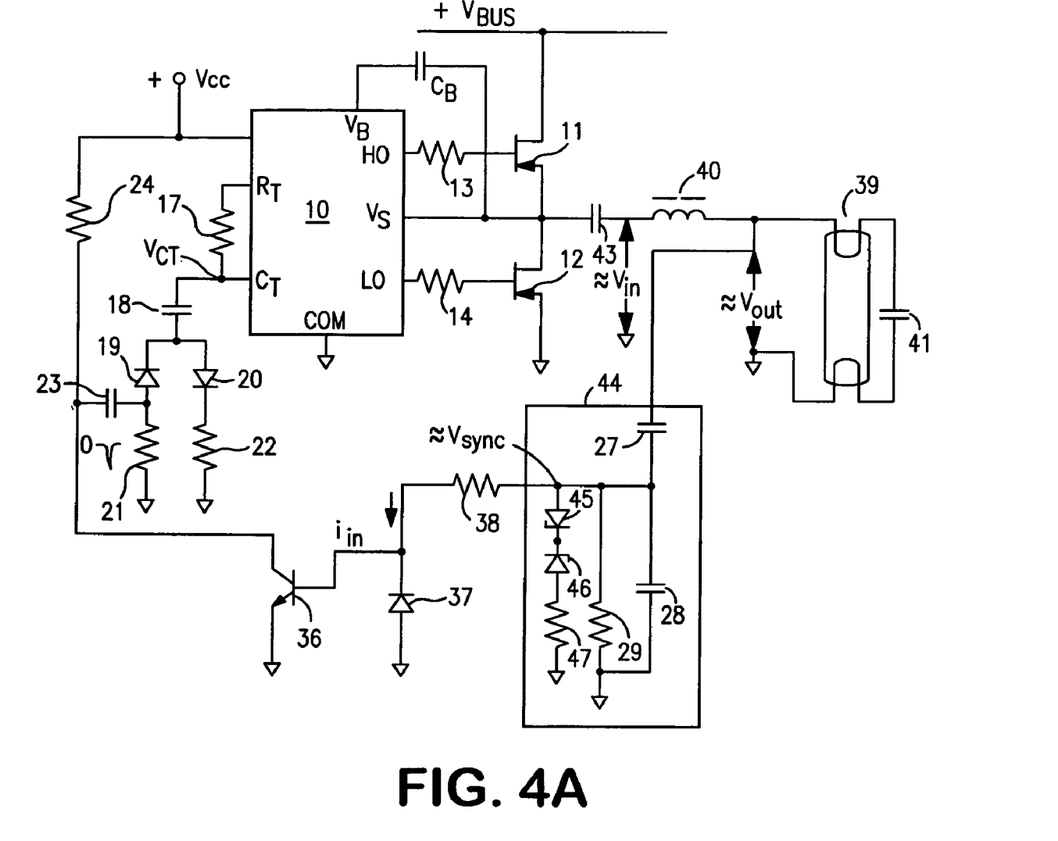
FIG. 4A shows a circuit diagram of a voltage resonant inverter for a ballast provided with variable phase shift in the loop lock up circuit.

FIG. 4A shows a further embodiment of the invention in a ballast resonance parallel inverter having a gas discharge lamp 39 as a load. The resonant tank of the inverter may include a resonant inductor 40 and a resonant capacitor 41 coupled in parallel to the lamp 39. A DC blocking capacitor 43 is connected in series with the inductor 40. The inverter phase lock up feed back network may include an improved phase compensator 44 having a non-linear series network with back-to-back connected Zener diodes 45 and 46 and resistor 47. This series network is connected in parallel to the lower capacitor 28 of the phase compensator 44. Zener diodes 45 and 46 have a threshold voltage that is a little bit higher than the peak of Vsync output voltage of the phase compensator in steady-state mode. Therefore, the resistor 47 would not conduct any current during this mode. In this mode, the operation of phase compensator 44 is similar to operation of phase compensator 26 in FIG. 3A.

Figure 4B:
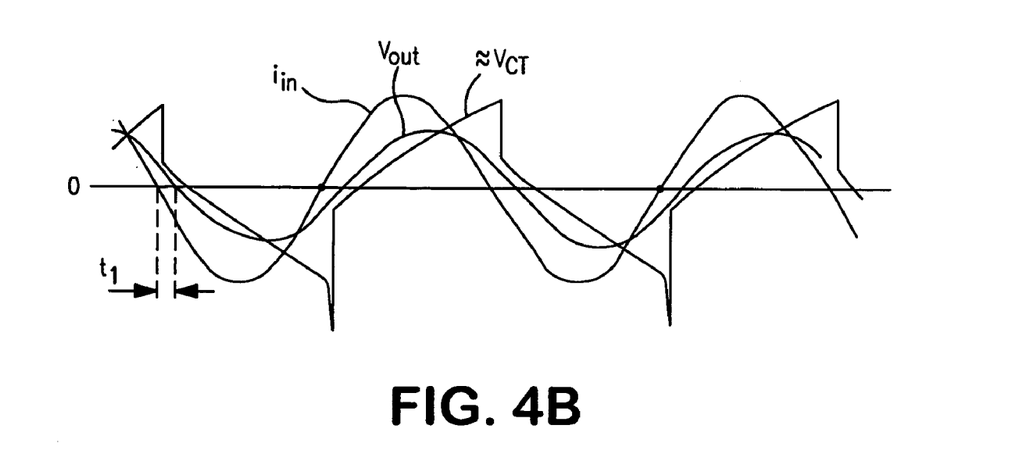
FIG. 4B shows waveforms of signals forming strobe pulses in the circuit of FIG. 4A in a steady-state mode.
Figure 4C:
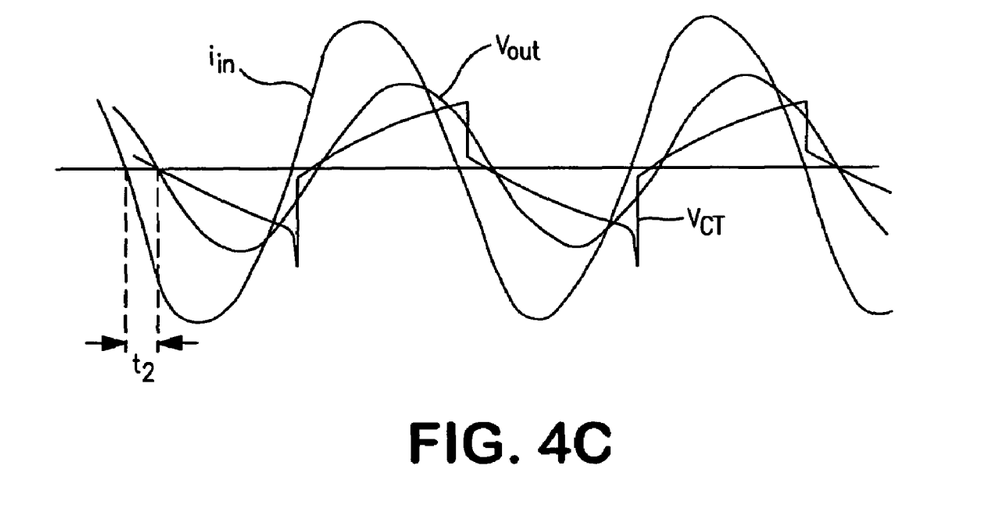
FIG. 4C shows the same waveforms as in FIG. 4B, but in an inverter open circuit mode or in the beginning of lamp starting interval.

Waveforms in steady-state mode are shown in FIG. 4B, where it may be seen that phase advance angle Ψ1 is generated by phase compensator 44 to provide nominal lamp power. During lamp starting, or open circuit mode, the resonant frequency of resonant load goes higher and may cause voltage and current stress in inverter components. Indeed, a capacitive mode that is stressful for MOSFETs is likely. This situation is prevented in the inverter of FIG. 4A during lamp starting. Since output voltage Vout of the inverter is much higher at starting that in steady-state mode, Vsync voltage across capacitor 28 of the phase compensator 44 is also higher and Zener diodes 45 and 46 start conducting. By introduction of resistor 47, the total resistance coupled to the capacitor 28 is decreased and the advance angle of phase compensator 44 is even higher than in steady-state mode. This results in higher switching frequency and output voltage reduction in the starting and open circuit modes. The ballast inverter operates above resonant frequency. Waveforms in the open circuit or lamp starting mode are shown in the FIG. 4C. Even if a sinusoidal input current to ZSD 36 is slightly distorted, the advance angle of this quasi-sinusoidal current is increased compared with a steady-state mode ($\Psi2>\Psi1$).

Figure 4D:
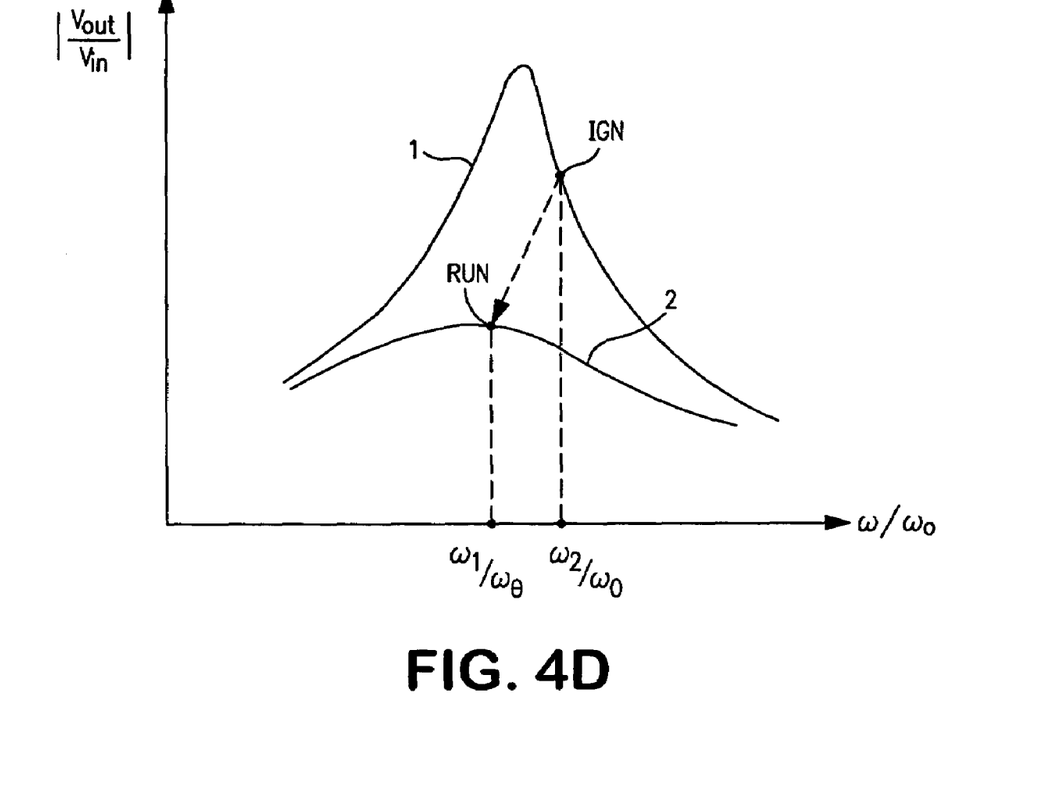
FIG. 4D illustrates frequency characteristics of the resonant inverter of FIG. 4A during lamp starting.

FIG. 4D shows transfer functions (real voltage gain |Vout/Vin| versus relative frequency $\omega/\omega_0$, where $\omega_0$ is a resonant frequency of an unloaded resonant tank). Plot 1 corresponds to an open circuit resonant tank transfer function assuming some power losses. Plot 2 illustrates a transfer function of the same resonant tank loaded by an operating lamp. FIG. 4D also illustrates ballast/lamp starting trajectory for the embodiment in FIG. 4A. Before ignition of the lamp its resistance is very high (plot 1) and the inverter generates high voltage Vout. The phase compensator 44 provides higher phase advance angle $\Psi2$ in the lock up loop of the resonant inverter. Therefore, the inverter operates in the inductive mode at the higher switching frequency $\omega_2$, which is an initial frequency of ignition (IGN in FIG. 4D). When the lamp is started and the resonant tank is loaded with a real resistance, resonant frequency decreases. Simultaneously, the phase angle of the phase compensator 44 decreases to $\Psi1$, and switching frequency also decreases to $\omega_1$. The system operating point (see FIG. 4D) transfers from IGN to RUN that corresponds to nominal output power of the inverter. During lamp starting the inverter always operates above its variable resonant frequency.

Figure 4E:
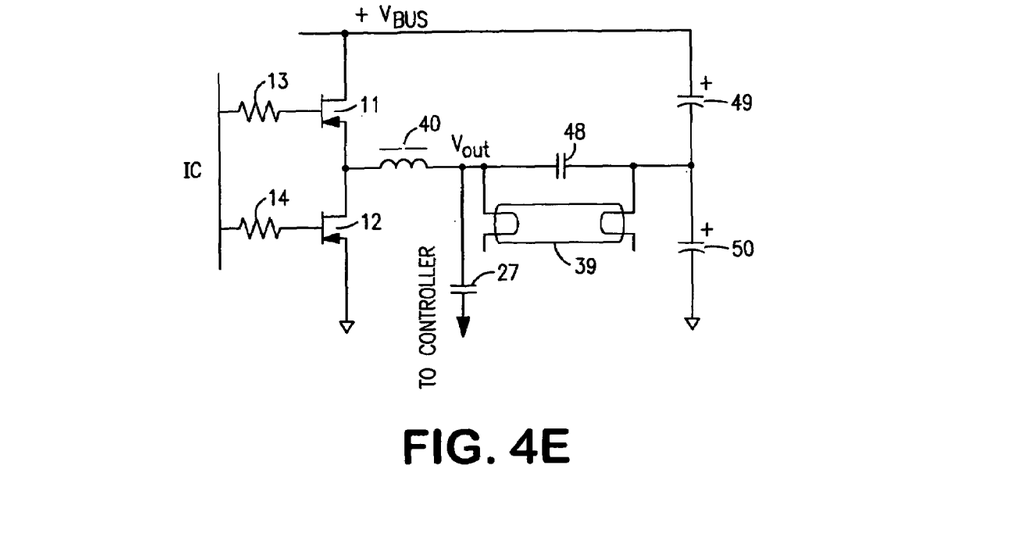
FIG. 4E shows an implementation of the control system in a symmetrical half bridge resonant inverter.

FIG. 4E illustrates an embodiment of a symmetrical half bridge parallel loaded resonant inverter. The load, for instance, gas discharge lamp 39, is connected in parallel to the resonant capacitor 48 and in series with a resonant inductor 40. First common terminals of the resonant capacitor 40 and the lamp 40 are connected to a junction of series storage capacitors 49 and 50. The input of the voltage feed back loop at capacitor 27 is connected to the second common terminals of the lamp 39 and resonant capacitor 40. The capacitor 27 blocks DC voltage from the storage capacitor 50 into the lock up loop.

Figure 4F:
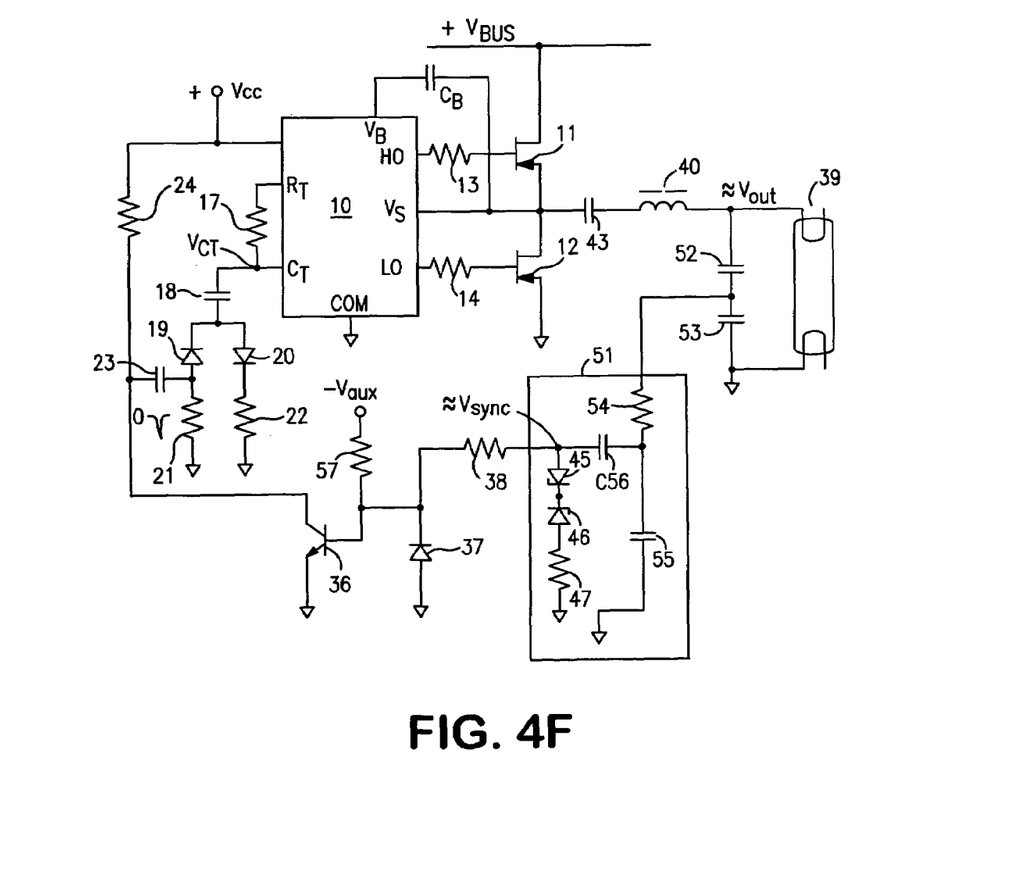
FIG. 4F shows an embodiment of the invention with a phase delay compensator in a voltage lock up loop.

FIG. 4F shows another embodiment having an enhanced phase compensator 51 providing a signal delay in the lock up loop. The phase compensator 51 input is connected to a voltage source that generates a voltage signal proportional to output voltage Vout. The phase compensator 51 is connected to the junction of series resonant capacitors 52 and 53, which both represent the parallel resonant capacitance of the inverter. The phase compensator 51 may include a first phase delay RC-network having a resistor 54 and capacitor 55, and also a second RC signal phase advance network comprising a capacitor 56 and resistor 38. It also includes a non-linear network similar to the one in FIG. 4B having Zener diodes 45, 46 and resistor 47.

In a steady-state mode, there is no current in the resistor 47. The delay angle of the first RC-network is selected to overcompensate for the phase advance of the second RC network. By having a phase delay in the lock up loop, higher output power can be achieved. That power can be further increased with a negative DC bias from negative auxiliary voltage Vaux via a resistor 57 to the base of transistor 36. The embodiment in FIG. 4F adds a negative bias to the input of transistor 36 to provide deep lamp dimming.

When starting the lamp, or in an open circuit mode, the inverter in FIG. 4F is protected from overvoltage and capacitive mode operation by increasing its switching frequency. At high voltage, Zener diodes 45 and 46 start conducting and the structure of lock loop is changed by introducing an additional series phase advance RC-network with capacitor 56 and resistor 47 providing a significant phase advance and system frequency boost.

Figure 5A:
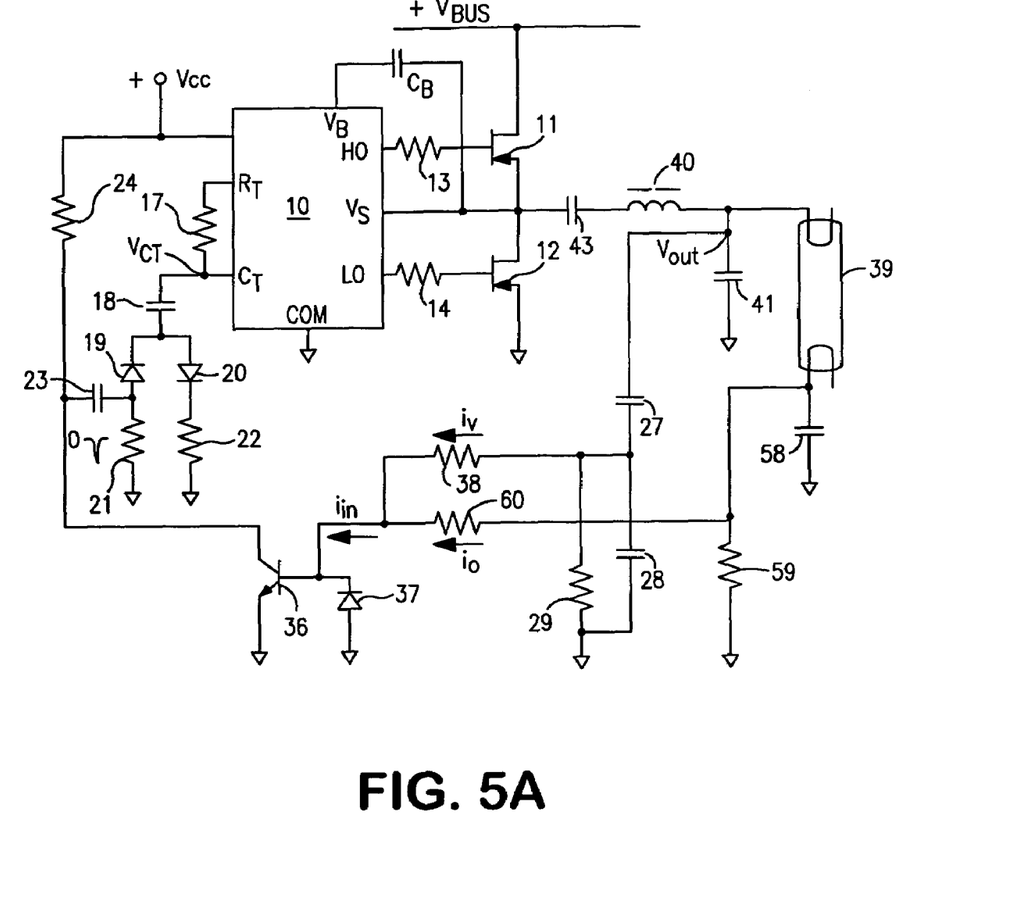
FIG. 5A shows a circuit diagram of the resonant inverter with combined voltage and current lock loops for optimized starting and steady-state modes.

FIG. 5A shows an embodiment combining two feed back lock up loops: a voltage loop according to the present invention described above (e.g., FIG. 1A) and a lamp current loop. A capacitor 58 connected in series to the lamp 39 is used as a lamp current sensor. Resistor 59 (optional) speeds up the capacitor 58 discharge when the lamp turns off. The capacitor 58 is coupled to the base of transistor 36 via resistor 60.

Figure 5B:
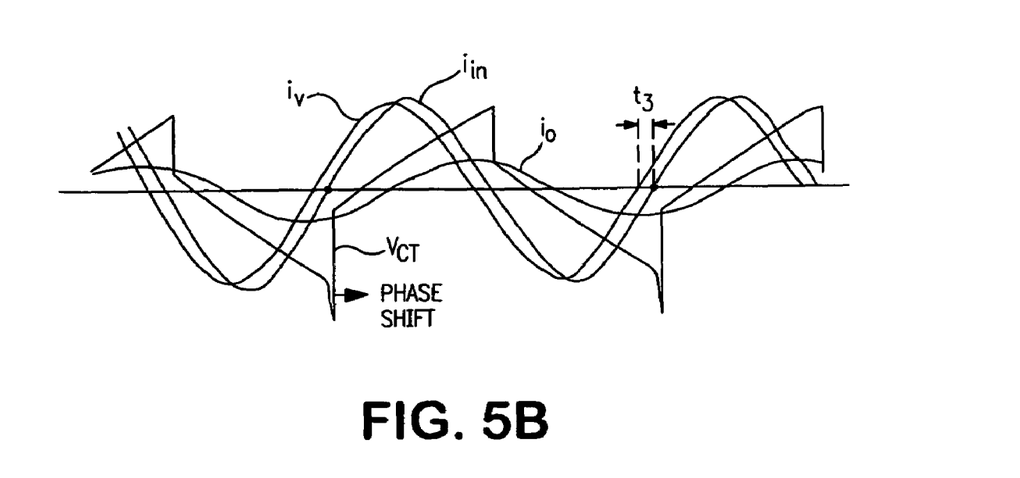
FIG. 5B shows waveforms in the circuit diagram of FIG. 5A after lamp starting.

FIG. 5B illustrates waveforms of signals in the control network of the inverter in FIG. 5A after lamp starting. During lamp starting, the signal from the lamp current sensor (capacitor 58) is negligibly low. The system is locked up via voltage feed back that is providing a current iv to the ZSD 36 in such a phase that the system generates a higher frequency at low power needed to provide specified starting voltage for the lamp 39.

Typically voltage loops provide phase advance regarding output voltage Vout during starting. Then, lamp current is built up and a limited current signal io appears in the current loop. Voltage across capacitor 58 and current $i_o$ both delay about 90° versus inverter output voltage Vout. Now the geometrical sum of above currents $i_v+i_o=i_{in}$, applied to the input of ZSD 36, features a phase delay shift (see a shift angle $\Psi3$ in FIG. 5B). This causes a corresponding phase shift of the strobe pulse superposed on ramp signal $V_{CT}$. As a result, inverter frequency is reduced and power is increased, so nominal lamp power is generated by the inverter after lamp starting.

Figure 6A:
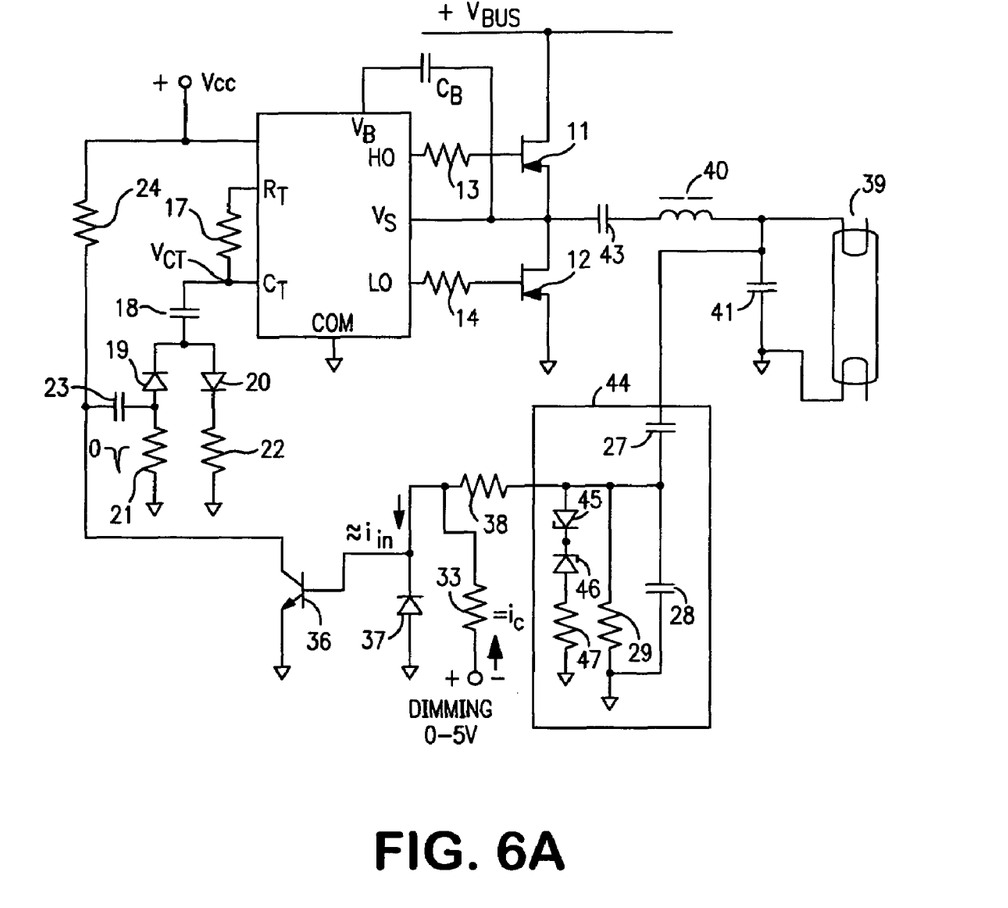
FIG. 6A is a circuit diagram of a ballast resonant inverter of the present invention with a dimming feature.
Figure 6B:
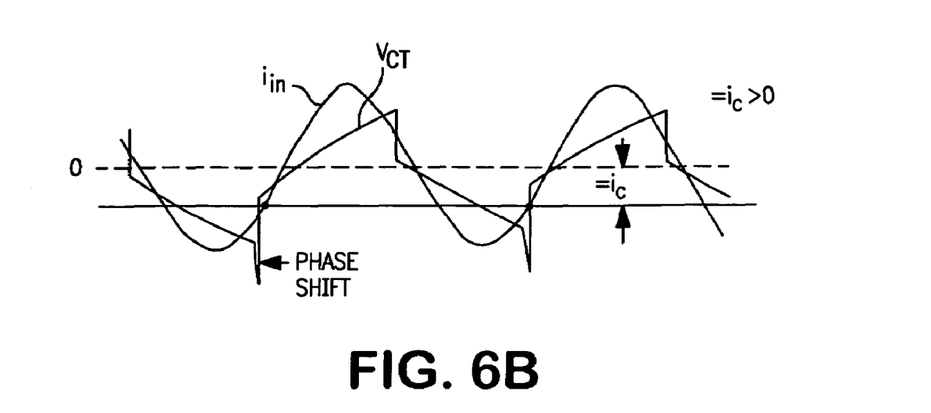
FIG. 6B shows waveforms of signals forming synchronizing strobe pulse in the circuit diagram of FIG. 6A when a DC dimming control signal is positive.

FIG. 6A illustrates a circuit diagram of a dimmable lamp ballast inverter, and is a version of the inverter circuit shown in FIG. 4A. The dimming control current $I_C$ provides a DC shift for sinusoidal signal current iin (see the waveforms in FIG. 6B). If the dimming signal is positive (ic>0), then transistor 36 turns on earlier, strobe pulse phase is advanced and switching frequency is increased. When the dimming signal is negative, switching frequency is decreased (not shown).

Figure 7A:
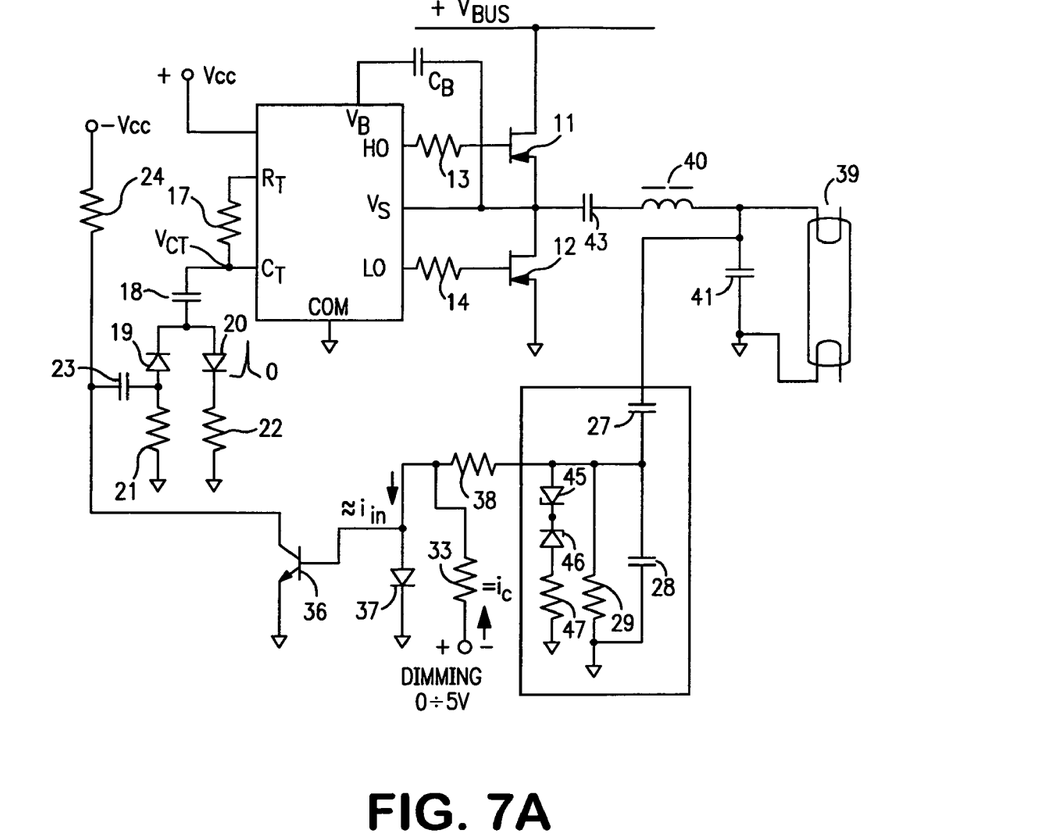
FIG. 7A shows a circuit diagram of a ballast resonance inverter of the present invention with synchronizing control based on a p-n-p transistor and with a dimming feature.
Figure 7B:
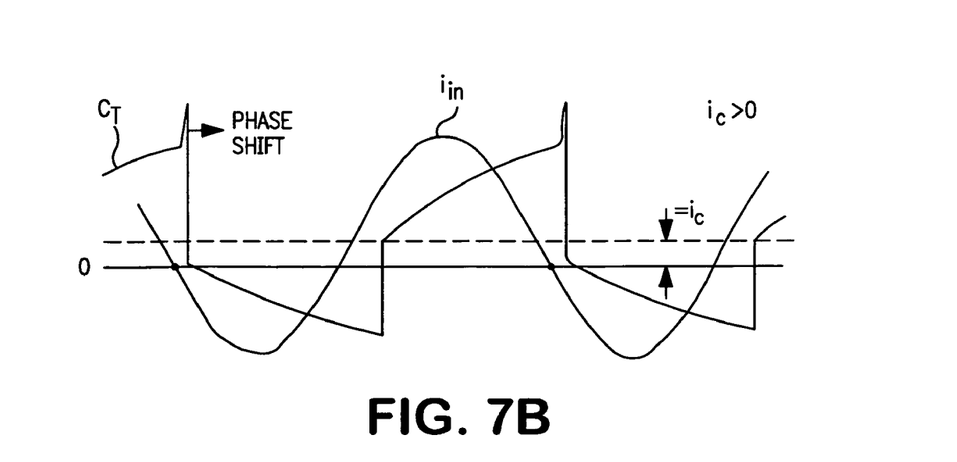
FIG. 7B shows waveforms of signals forming synchronizing control strobe pulses in the circuit diagram of FIG. 7A when DC dimming control signal is negative.

FIGS. 7A and 7B illustrate dimming control for a dimmable lamp ballast inverter having a circuit diagram derived from the inverter circuit diagram in FIG. 2A. This embodiment uses a p-n-p transistor 36 as the zero signal detector.

Figure 8:
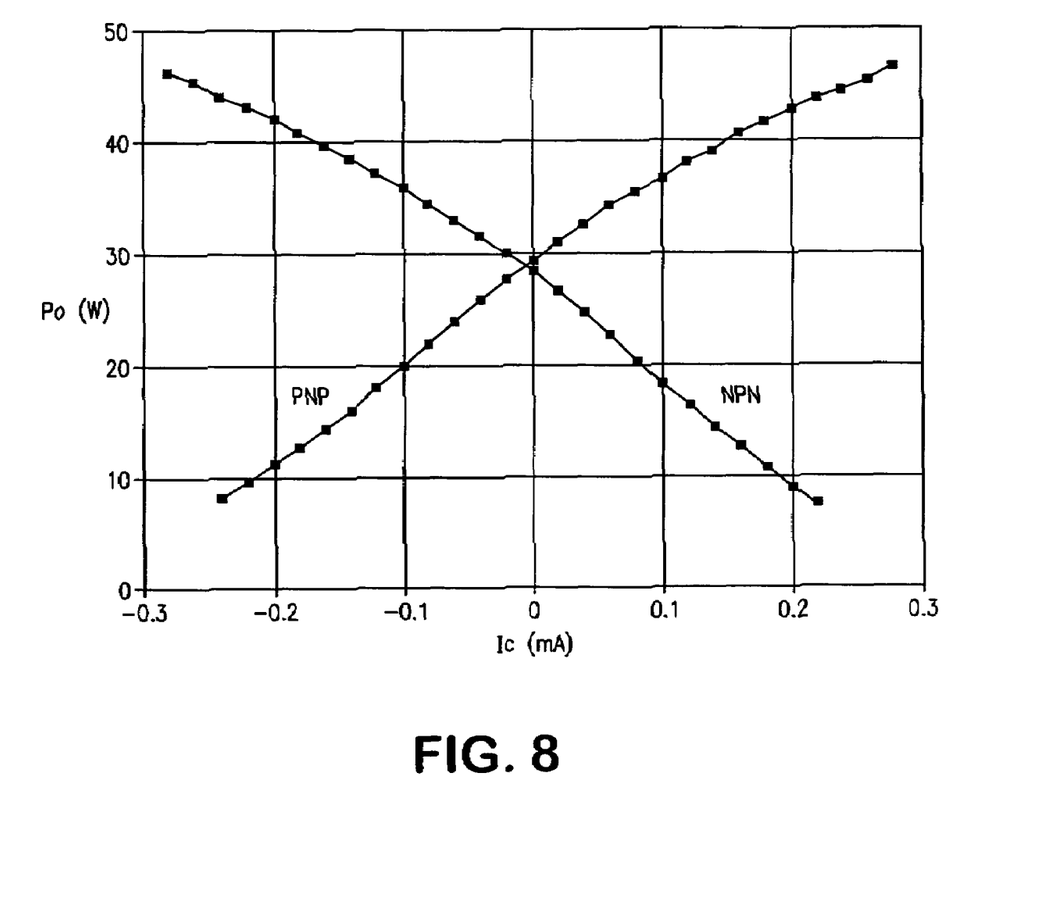
FIG. 8 illustrates dimming characteristics (output power versus DC control signal) of a ballast inverter with control circuits of FIG. 6A (n-p-n) and FIG. 7A (p-n-p) when powering the same gas discharge lamp.

FIG. 8 presents dimming control characteristics for resonant inverters of FIGS. 6A and 7A. Both inverters were almost identical and power standard T8 lamps from 155 VDC Bus.

While embodiments of the present invention have been described in the foregoing specification and drawings, it is to be understood that the present invention is defined by the following claims when read in light of the specification and drawings. Both inverters utilize an IR21531 controller operating at 125 kHz at nominal lamp power. By applying a DC bias ($I_C$), phase advance (delay) angles in the voltage feed back circuit can be changes from 45° to −45° that provide a wide range of frequency and power regulation capability.

I claim:

1. A resonant inverter comprising:
   a self-oscillating driver circuit having timing and common terminals;
   a voltage source;
   a timing capacitor connected to said timing terminal;
   a zero signal detector that changes an output signal when an input signal at a first input terminal changes polarity;
   two anti-parallel diodes and two resistors connected in series with respective ones of said two diodes, said two diodes being connected to said timing capacitor and said two resistors being connected to said common terminal; and a further capacitor connecting said voltage source to a first node between a first one of said two diodes and the respective first one of said two resistors, said further capacitor also being connected to an output of said zero signal detector so that said zero signal detector initiates discharge of said further capacitor to said first one of said two resistors when said zero signal detector input signal changes polarity and superposes strobe pulses generated across said first one of said two resistors on a voltage of said timing terminal.

2. The resonant inverter of claim 1, further comprising a resonant tank connected to an output of said driver circuit, and a feed back circuit that connects an output of said resonant tank to said first input terminal of said zero signal detector, said feed back circuit comprising a source of a variable bias current that is connected to said first input terminal of said zero signal detector to shift an angle at which polarity changes to control a frequency for the resonant inverter.

3. The resonant inverter of claim 2, wherein said feed back circuit further comprises a phase compensator.

4. The resonant inverter of claim 1, further comprising a pair of switching transistors operated by said driver circuit and generating a voltage across an input of a resonant tank, wherein an output of said resonant tank is connected to a controller through a phase compensator and an output of said controller is connected to said first input terminal of said zero signal detector.

5. The resonant inverter of claim 4, wherein said phase compensator comprises two capacitors connected in series between said output of said resonant tank and said common terminal and a further resistor in parallel with one of said two capacitors that is closest to said common terminal.

6. The resonant inverter of claim 5, wherein said phase compensator further comprises, in parallel with said further resistor, a pair of Zener diodes connected back-to-back.

7. The resonant inverter of claim 4, wherein said controller comprises a second node N that is connected to said first input terminal of said zero signal detector, said phase compensator, and a source of DC bias current.

8. The resonant inverter of claim 1, wherein said zero signal detector comprises one of a p-n-p and an n-p-n transistor.

9. The resonant inverter of claim 1, wherein said feed back circuit comprising a source of a variable bias current that is connected to said first input terminal of said zero signal detector to shift an angle at which polarity changes to control a frequency for the resonant inverter from 45° to −45°.

* * * * *